United States Patent [19]

Roger

[11] 4,176,679
[45] Dec. 4, 1979

[54] CHECK VALVE

[76] Inventor: Harry Roger, 124 Banks Ave., Lafayette, La. 70506

[21] Appl. No.: 890,669

[22] Filed: Mar. 27, 1978

[51] Int. Cl.² .............................................. F16K 31/14
[52] U.S. Cl. ..................................... 137/495; 137/461; 137/505.13; 137/516.29; 137/519.5
[58] Field of Search ........... 137/460, 461, 495, 505.13, 137/516.29, 519.5

[56] References Cited

U.S. PATENT DOCUMENTS

| 1,820,138 | 8/1931 | Hargis | 137/519.5 X |
| 2,285,049 | 6/1942 | Parks | 137/505.13 X |
| 2,929,401 | 3/1960 | Cowan | 137/516.29 |
| 3,106,226 | 10/1963 | Machen | 137/519.5 X |
| 3,407,827 | 10/1968 | Follett | 137/519.5 X |
| 4,120,315 | 10/1978 | Snyder | 137/519.5 X |

Primary Examiner—Harold W. Weakley
Attorney, Agent, or Firm—Guy E. Matthews

[57] ABSTRACT

A check valve is disclosed which uses a valve body having a bore with a first section smaller than a second section, an inlet communicating with the first section to receive flowing fluid, a shoulder disposed between the first section and the inlet for providing a valve seat, and an outlet communicating with the second section for discharging the fluid. A valve element is mounted within the inlet for engaging with the valve seat to shut off the fluid flow. A movable piston is mounted with the valve body to control movement of the valve element. The piston has a body portion slidably mounted with the second section, the body portion having a shoulder facing away from the valve element; a male portion is slidably mounted with the first section and extends from the body portion, the male portion having a shoulder facing toward the valve element; and a stem extends from the male portion into the inlet of the valve body for mounting with the valve element. A passageway is provided in the piston for placing the first and second sections into communication; an opening force is provided on the movable piston by pressure from the fluid in the second section; and a closing force is provided on the movable piston by the pressure of the incoming fluid acting on the valve element and the male portion shoulder. The fluid flow is checked with the pressure of the incoming fluid is sufficiently great to cause the closing force to override the opening force.

6 Claims, 3 Drawing Figures

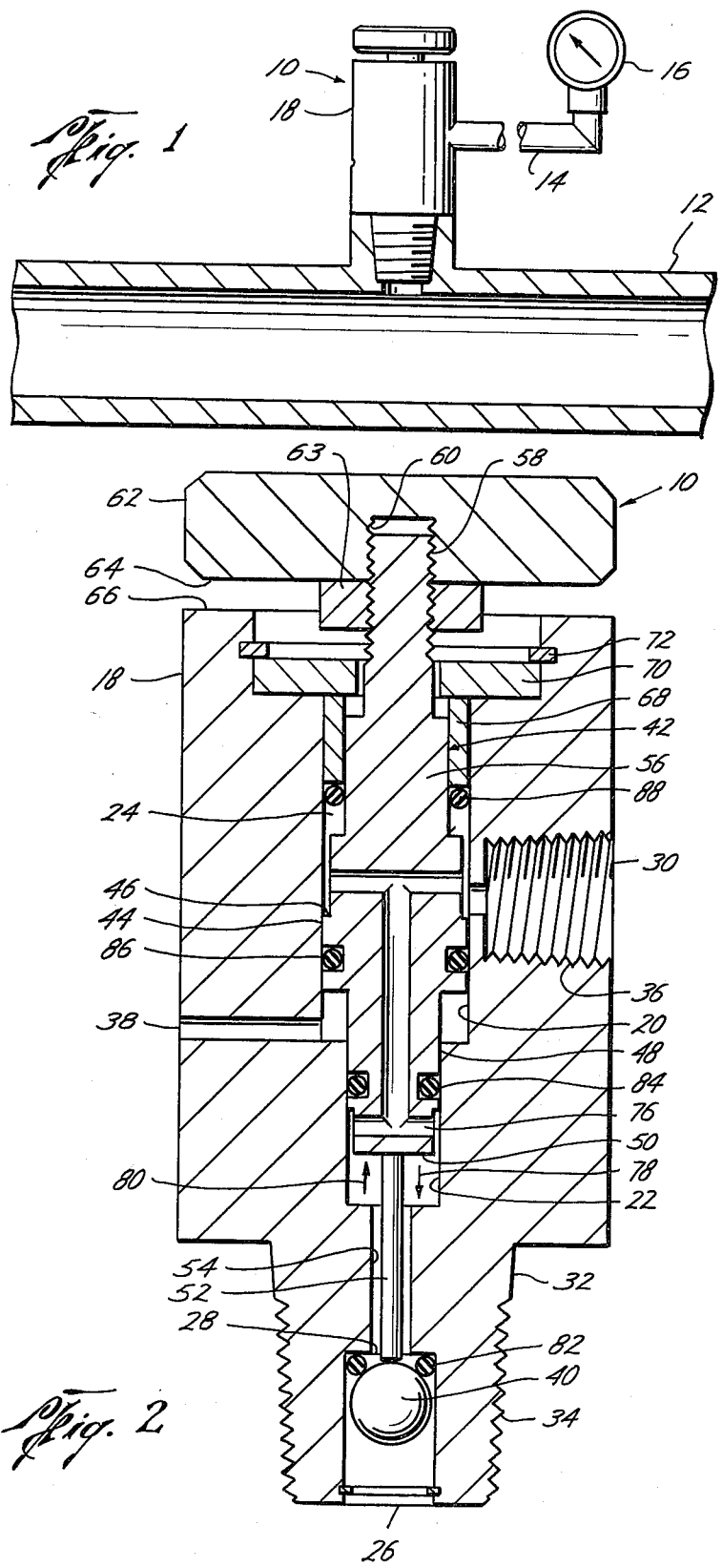

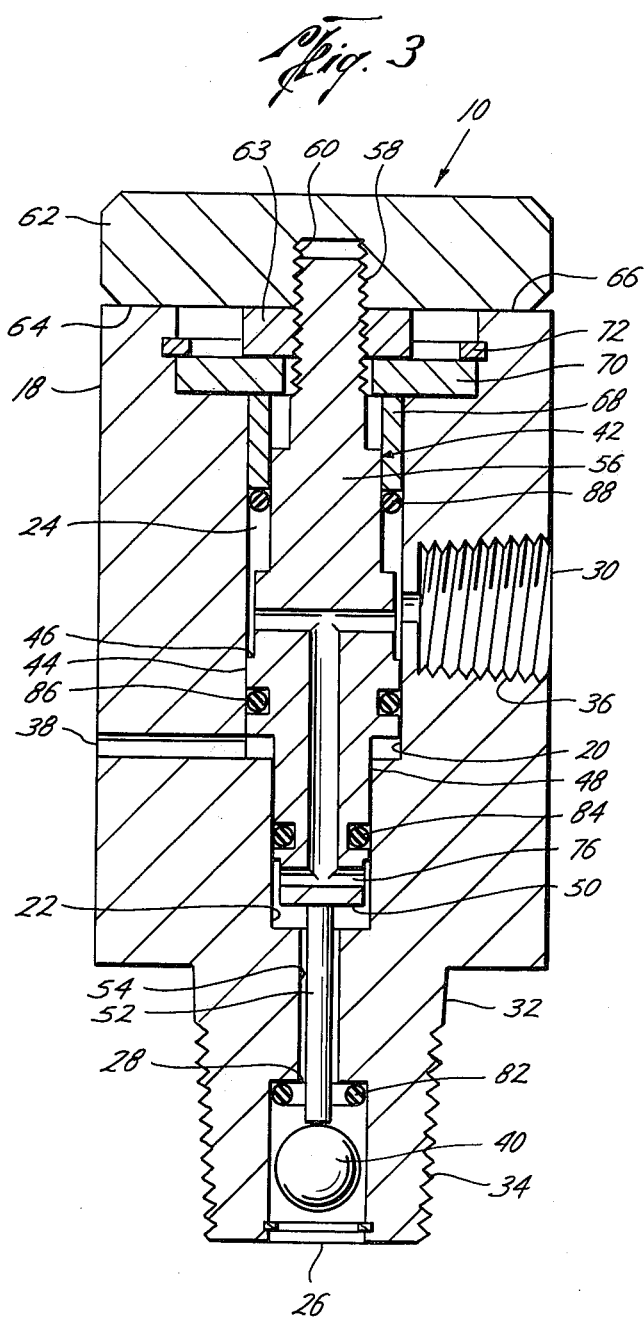

4,176,679

CHECK VALVE

BACKGROUND AND SUMMARY OF THE INVENTION

The use of check valves in the oil industry to prevent pollution, shut off a possible fuel source to a fire, and protect personnel and equipment are well known.

The most common type of check valves employ a ball valve element for seating within a valve body valve to shut off flow therethrough. A spring is used to urge the ball toward the seat, which is opposite to the direction of the incoming fluid flow. Thus, the flow of fluid therethrough is cut off when the pressure of the fluid flowing around the ball is insufficient to overcome the force generated by the spring. Such valves have a common handicap in that a shut off valve must be provided on the inlet of the check valves so that the check valve may be reopened after closing. Accordingly, it is necessary to insert a shut off valve upstream of the check valve which thereby makes the use of such check valves unnecessarily expensive.

Another difficulty with such prior art check valves is that a single seal is provided between the valve element and seat. Accordingly, such prior art valves fail to provide a primary (soft) seal to prevent fluid flow and a secondary (metal to metal) seal, which acts as a fire seal.

In accordance with the invention, a check valve is provided which uses a valve body having a bore with first and second sections, the cross sectional area of the first section being smaller than the cross sectional area of the second section; an inlet communicates with the first section of said bore for receiving flowing fluid into the valve body; a shoulder is disposed between the first section of the bore and an inlet for providing a valve seat; and an outlet communicates with the second section of the bore for discharging flowing fluid from the valve body. A valve element is mounted within the inlet of the valve body for engaging with the valve seat to shut off fluid flow through the valve body. The movable piston is mounted within the inlet of the valve body for engaging with the valve seat to shut off fluid flow through the valve body. The movable piston is mounted with the valve body for controlling movement of the valve element with the piston having a body portion slidably mounted in the second section of the bore, the body portion having a shoulder facing away from the valve element. The piston also has a male portion extending from the body portion and is slidably mounted in the first section of the bore, the male portion having a shoulder facing toward the valve element. A stem extends from the male portion into the inlet of the valve body, and the valve element is mounted with the stem. A passage is provided in the piston for placing the first section of the bore in communication with the second section so that an opening force is provided on the movable piston by the pressure from the fluid in the second section acting on the body portion shoulder. Also, a closing force is provided on the movable piston by the pressure of the incoming fluid acting on the valve element and the male portion shoulder. The valve element is thus moved into engagement with the valve seal when the pressure of the incoming fluid is sufficiently great to cause the closing force to override the opening force and thereby check the uncontrolled flow of fluid out of the valve body.

BRIEF DESCRIPTION OF THE DRAWINGS other objects and advantages of the invention will become apparent upon reading the following detailed description and upon reference to the drawings, in which like reference characters are used throughout to designate like parts.

FIG. 1 is a schematic view of a check valve constructed according to the present invention disposed in a system;

FIG. 2 is an elevation view of an exemplary embodiment of a check valve constructed according to the present invention in the closed position; and FIG. 3 is an elevational view of the embodiment shown in FIG. 2 in the open position.

While the invention will be described in connection with a preferred embodiment, it will be understood that it is not intended to limit the invention to the embodiment. On the contrary, it is intended to cover all alternatives, modifications, and equivalents as may be included within the spirit and scope of the invention as defined by the appended claims.

DETAILED DESCRIPTION OF THE INVENTION

Turning first to FIG. 1, there is shown a check valve 10 interconnecting a flow line 12 and a control line 14, which leads to a reprint pressure gauge 16. It is to be understood that check valve 10 is not limited to use in a flow line, but may also be used by mounting it to separators or any other pressurized vessel used for supporting fluids. It is also to be understood that the invention is not limited to use with a pressure gauge but may be used with pressure control valves and similar apparatus.

As best seen in FIGS. 2 and 3, there is shown check valve 10, which is an exemplary embodiment constructed according to the present invention. Check valve 10 comprises a valve body 18 having a bore 20 with a first section 22 and a second section 24, with the cross sectional area of first section 22 being smaller than the cross sectional area of second section 24. An inlet 26 is provided on valve body 18 for communicating with first section 22 of bore 20 for receiving flowing fluid into valve body 18. A shoulder 28 is disposed between first section 22 of bore 20 and inlet 26 for providing a valve seat. An outlet 30 communicating with second section 24 of bore 20 is provided in valve body 18 for discharging flowing fluid from the valve body. Preferably, inlet 26 is provided in a male member 32 of body 18 which has threads 34 provided externally thereof for threadably connecting into the device being sensed or controlled, as in flow line 12 illustrated in FIG. 1. Further, outlet 30 preferably has threads 36 provided internally thereof for threadably connecting to control line 14. A passageway 38 communicating with second section 24 of bore 20 is also provided in the valve body 18 near inlet 26 for exhausting from such portion of the second section.

A valve element is mounted within inlet 26 of valve body 18 for engaging with the valve seat to shut off fluid flow through the valve body. Preferably, valve element 40 is a ball having a diameter slightly smaller than inlet 26 so that the velocity of the fluid flow around the ball will cause a pressure differential on the element.

A movable piston 42 is mounted with valve body 18 for controlling movement of valve element 40. Piston 42 has a body portion 44 slidably mounted within second section 24 of bore 20 and a shoulder 46 facing away from valve element 40 is provided thereon. A male portion 48 extending away from body portion 44 is slidably mounted within the first section 22 of bore 20, and a shoulder 50 facing toward valve element 40 is provided thereon. A stem 52 extends from male portion 48 through a passage 54 into inlet 26 for mounting with valve element 40. Preferably, an opening portion 56 extends from body portion 44 in a direction opposite from male portion 48 for disengaging valve element 40 from the valve seat by movement thereof externally of valve body 18. Opening portion 56 has a cross sectional area less than the cross sectional area of body portion 44 and the cross sectional area of body portion 44 minus the cross sectional of opening portion 56 is the cross sectional area of body portion shoulder 46. Male threads 58 are provided on the external periphery of opening portion 56 for engaging with female threads 60 in control knob 62. A lock nut 63 is used to secure knob 62 to opening portion 56 and thereby prevent control knob 62 from being unscrewed therefrom. A shoulder 64 is provided on control knob 62 for engaging a surface 66 on valve body 18 to limit the movement of valve element 40 away from the valve seat. Moreover, a sleeve 68 may be provided within second section 24 of bore 20 to limit movement of piston 42. A retainer 70 is provided to limit movement of sleeve 68, and a retainer ring 72 engages in slots within valve body 18 for limiting movement of retainer 70.

A passageway 76 is provided in piston 42 for placing first section 22 of bore 20 in communication with second section 24. Thus, as shown in FIG. 3, under normal conditions, fluid flows around valve element 40 and flows through passage 54 into first section 22 of bore 40, through passageway 76 and into second section 24 of bore 20, and from there out through outlet 30. An opening force, acting in the direction of arrows 78, is provided on movable piston 42 by the pressure from the fluid in second section 24 acting on body portion shoulder 46. Further, a closing force, acting in the direction of arrow 80 is provided on movable piston 42 by the pressure of the incoming fluid acting on valve element 40 and male portion shoulder 50. Valve element 40 is moved into engagement with the valve seal, as shown in FIG. 2, when the pressure of the incoming fluid is sufficiently great to cause the closing force to override the opening force and thereby check the uncontrolled flow of fluid out of said valve 10.

An O-ring 82 may be mounted on shoulder 28 to provide a seat, which forms a primary (soft) seal with element 40, and, when necessary, element 40 may move past the primary seat shoulder 28 to form a secondary seal.

It is also preferred that an O-ring 84 be mounted around the periphery of male member 48 for slidably engaging second second 22 and an O-ring 86 be mounted around the periphery of body portion 44 for slidably engaging second section 24. These seals will restrict flow of fluid from first section 22 to second section 24 to through passageway 76 in movable piston 42. Thus, passage 38 is used to exhaust any fluids between seals 84 and 86 within second section 24. Further, it is preferred that an O-ring seal 88 be provided at the lower extremity of sleeve 68 to prevent fluid flow around opening portion 56 of movable piston 42.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A check valve, comprising:
    (a) a valve body having:
        (i) a bore with first and second sections, the cross sectional area of the first section being smaller than the cross sectional area of the second section,
        (ii) an inlet communicating with the first section of said bore for receiving flowing fluid into said valve body,
        (iii) a shoulder disposed between the first section of said bore and said inlet for providing a valve seat, and
        (iv) an outlet communicating with the second section of said bore for discharging flowing fluid from said valve body;
    (b) a valve element mounted within the inlet of said valve body for engaging with the valve seat to shut off fluid flow through said valve body;
    (c) a movable piston mounted with said valve body for controlling movement of said valve element, said piston having:
        (i) a body portion slidably mounted with the second section of said bore, said body portion having a shoulder facing away from said valve element,
        (ii) a male portion extending from said body portion slidably mounted in the first section of said bore, said male portion having a shoulder facing toward said valve element,
        (iii) a stem extending from said male portion into the inlet of said valve body, said valve element being mounted with the end of said stem;
    (d) a passageway provided in said movable piston for placing the first section of said bore in communication with its second section, an opening force being provided on said movable piston by the pressure from the fluid in the second section on the body portion shoulder, a closing force being provided on said movable piston by the pressure of the incoming fluid acting on said valve element and male portion shoulder; and
    (e) said valve element being moved into engagement with the valve seat when the pressure of the incoming fluid is sufficiently great to cause the closing force to override the opening force and thereby check the uncontrolled flow of fluid out of said valve body.

2. The valve as set forth in claim 1, wherein said piston includes an opening portion extending from said body portion in a direction opposite from said male portion for disengaging said valve element from the valve seat externally of said valve body, said opening portion having a cross-sectional area less than the cross-sectional area of said body portion, are wherein the cross-sectional area of said body portion minus the cross sectional area of said opening portion is the cross sectional area of the body portion shoulder.

3. The valve as set forth in claim 2, including a control knob mounted with the opening portion of said movable piston for controlling movement of said piston, said knob having a shoulder for engaging with a surface of said valve body to limit the movement of said valve element away from the valve seat.

4. The valve as set forth in claim 1, wherein said valve element is a ball mounted within the inlet into said valve body.

5. The valve as set forth in claim 4 including a seal means mounted with the shoulder in said body, said valve element being movable into engagement with said seal means and the shoulder to provide primary and secondary sealing within said valve body.

6. The valve as set forth in claim 1 including seal means mounted around the periphery of said body and male portions for engaging the first and second sections to restrict flow of fluid from the first to the second sections of said bore to through the passageway in said movable piston.

* * * * *